3,248,277
PROCESS FOR THE PURIFICATION OF AQUEOUS DISPERSIONS OF FIBROUS MATERIALS
Wilhelm Gärtner, Neunkirchen, Odenwald, Germany, assignor, by mesne assignments, to FMC Corporation, New York, N.Y., a corporation of Delaware
No Drawing. Filed July 3, 1962, Ser. No. 207,420
Claims priority, application Germany, July 5, 1961, D 36,496
1 Claim. (Cl. 162—5)

This invention relates to the purification of fiber slurries, and particularly to a process of separating impurities from aqueous dispersions of fibers concurrently with separation of these fibers from waste papers.

In all industrial operations with a large requirement for fresh water and accordingly also a large accumulation of waste water, efforts are made to keep the requirement for fresh water small by recirculating the waste water, and by keeping the waste water clean. This question is of particular importance in the paper and board industry because of the large amounts of process water used in its operation. Water is used in this industry for dissolving, washing out, and transportation of the initial substances, intermediate products, and final products. Water used in processing waste papers is especially highly contaminated by the separation of dirt, fat, wax, resin, printing ink, etc., from the fibers being recovered. This waste water is frequently discharged to the sewer, the degree of contamination frequently setting limits on repeated utilization of the water in the process cycle.

Hitherto, purification of waste water has been carried out in settling ponds or settling tanks, or by flotation. In flotation, the major consideration is the regaining of fibers and filling materials. The impurities are mostly disregarded, and thus remain in the waste water and contaminate the water courses. In this case, therefore, flotation is carried out only to separate and recover fibers and filling materials.

Recently, another type of flotation has been used for the purification and processing of waste paper. In the practice of this process, impurities such as dirt and printing inks are carried upwards and removed from the fibers and fillers. Flotation agents and foamers which separate off and emulsify the impurities are employed and make it possible to separate these undesirable materials in the form of a foam from the fibers. This foam, containing the printing inks, especially lampblack, printing colors, mineral oils, fats, waxes, and resins is separated from the clean fiber dispersion by means of skimming devices on the surface. The foam is then separated into solids and water, by a process such as centrifuging. The contaminants finally are recovered in the form of a solid, crumbly mass containing 50% or more solids. This waste can be burned or discarded. In carrying out this process, the raw material, for example, waste paper, rags, and the like is pulped, freed from metallic and other impurities in a screening operation, freed from specks and then purified in several flotation cells connected in series.

In this prior process, the flotation agent is introduced just before the entry of the material to be purified into the flotation cells. However, in spite of the use of several flotation cells, dirt and printing colors are always retained on the fibrous material and are carried from one cell to the next. A complete purification of the fibrous material can be effected only by using a large number of flotation cells.

It has now been found that a greatly improved purification of fiber from waste is obtained by carrying out a flotation step concurrently with separation of the raw waste material in the pulper, hollander beater or other fiber separation device. According to the invention, therefore, a flotation agent is added to the raw waste materials to be separated into fibers while they are in the fiber separation device, and a flotation purification is begun in the first phase or pulping step of the fiber treatment. If necessary, the raw waste materials can be impregnated with the flotation agent before pulping is commenced.

By this means a foam containing the impurities is formed in the pulper, and caused to rise to the surface of the process slurry of fibers in water, from which point it can be removed readily by means of foam collecting or skimming devices. For this purpose, it is possible to employ deflection, diversion or suction devices, which in themselves are known, but which hitherto have not been used in fiber separation apparatus. These devices conduct the foam into overflow gutters or pipes.

It is helpful to blow air into the base of the vessels during the pulping and flotation step. Separation of the impurities and their concentration in the foam is substantially facilitated by this additional process feature. Likewise, optimum collection of impurities at the surface of the fiber slurry occurs when the dispersion of fibrous material takes place in a horizontally circling movement during the flotation, without moving materials downwards. This can readily be achieved in the case of standing or lying tanks by a suitable arrangement of stirring devices.

In order to avoid losses of fibrous material during flotation, and to improve the purity of the fibers, it is preferred that a mixture of a peroxygen compound, e.g., hydrogen peroxide or sodium peroxide, with water glass (sodium silicate) and a non-ionic surfactive substance employed as the flotation agent. Useful non-ionic surfactive agents include alkoxylated fatty alcohols, such as stearyl alcohol or oleyl alcohol and likewise alkoxylated tall oil. If desired, other surfactive substances may be employed with or in place of the non-ionic materials, it being important that they do not decompose the peroxygen compound.

Where it is desired to provide a particularly clean fiber product, and a particularly clear waste water, it is possible to carry out a further flotation step in known fashion following the herein combined fiber separation-flotation process.

The process of this invention makes it possible to free each fiber of impurities before its further processing to form paper or board. This provides not only for purer and whiter end products, but also for the provision of waste waters which are so clean that drainage of the apparatus in the cycle is not fouled and the water can be discarded without contaminating streams, or the like, to which it is sent.

In carrying out this process, waste papers, rags, fiberboards and the like, either alone or mixed with chemical, semi-chemical, or mechanical pulps may be used as raw, waste material. In any case, the present concurrent flotation process and fiber separation will result in production of a clean, pure pulp and a waste water which can be reused or, if desired, discarded safely into a water course.

The following examples are given only by way of illustration of the present process, and are not intended to limit the scope thereof in any way.

*Example 1*

One percent of sodium peroxide, 3% of water glass (sodium silicate) and 0.3% of stearyl alcohol based on dry weight of the fiber-containing feed were added to a feed composed of 40% sulfite pulp, 40% mechanical wood pulp and 20% of waste paper, in a hollander beater provided with an overflow gutter. In the process 2,000 kg. of fiber was produced in the beater per hour. Air was blown in from below the beater contents and the foam floating on them was conducted to the overflow gutter by means of a skimming device. This foam was separated into solid material and water in a centrifuge.

In a like beater process conducted as a control without flotation and without the peroxide, water glass and stearyl alcohol, paper was produced from this fiber mixture which had a white content of 65% on a G.E. Reflectometer; the waste water from the process was colored brown. The fibers processed in the manner of the invention yield a paper having a white content of 71%, and the waste water was clear.

*Example 2*

Mixed waste paper was first separated into fibers in a pulper, and thereafter, in a separate step, the fibers were purified in a flotation unit consisting of 10 flotation cells. By this means fibers were produced which could be formed into crepe paper having a brightness reading of 61% on a G.E. Reflectometer. When the application of the flotation process of Example 1 was carried out with the flotation agent solution described below, on another sample of the waste paper, followed by application of a second flotation step as shown below, a markedly superior purification of the fibers was obtained in that crepe paper produced from these fibers had a brightness of 68%.

In this example, the raw material was impregnated before pulping with an aqueous solution containing 2% of sodium peroxide, 5% of water glass (sodium silicate) and 0.3% of oleyl alcohol based on dry weight of the fiber feed. The impregnated material was allowed to stand for approximately one hour, and then fed to a pulper. The dirt which floated up in the foam was removed in the pulper by means of suction devices, and the material was then further purified in a one-cell flotation. This combination of flotations both during and after pulping provided a particularly clear waste water, along with fibers which were bright in color.

*Example 3*

Eight hundred kilograms of mixed waste paper was processed hourly as raw material in a paper factory. In the absence of the flotation process described in Example 2, the water was very rapidly colored dark brown to black by the strong contaminations of the old waste paper. By addition of the flotation and foam agent of Example 2 to the pulper during pulping, it was possible to float the dirt and color materials present in solution to the surface and to remove them by means of an overflow gutter. The foam separated in this way when conducted to a centrifuge separates into a solid, crumbly material and water. The solid material, which amounts to 1.5% of the weight of the dry waste paper, may be discarded in a dump. The water separated from the solids was colored only light yellow, and the cycle water likewise remains light yellow. Furthermore, cardboard produced from fibers produced by the new process was substantially purer, and about 6 points higher in brightness than cardboard produced from fibers made in a factory when the flotation process of the invention was not used in an otherwise substantially equivalent process.

I claim:

Process for concurrently pulping waste paper and removing impurities therefrom, comprising dispersing the waste paper together with a peroxygen compound from the group consisting of hydrogen peroxide and sodium peroxide, sodium silicate and a non-ionic wetting agent from the group consisting of the alkoxylated fatty alcohols and alkoxylated tall oil in water in a fiber separation and flotation vessel, circulating the aqueous dispersion formed thereby in a horizontally circling movement, and blowing air into said vessel from below the level of the contents of said vessel, whereby the waste paper is pulped and impurities in the waste paper are caused to rise to the surface of the dispersion, and removing said impurities from said surface of said dispersion leaving in said vessel a clean, aqueous dispersion of pulp.

References Cited by the Examiner

UNITED STATES PATENTS

| | | | |
|---|---|---|---|
| 1,245,839 | 11/1917 | Waring | 162—5 |
| 1,351,092 | 8/1920 | Baskerville | 162—5 |
| 1,396,227 | 11/1921 | Marr | 162—5 |
| 1,585,092 | 5/1926 | Granton | 209—166 |
| 1,813,988 | 7/1931 | Chambers | 241—21 |
| 1,958,035 | 5/1934 | De Coursey | 209—166 |
| 1,993,362 | 3/1935 | Crisp | 162—5 |
| 2,018,933 | 10/1935 | Wells | 162—5 |
| 2,116,511 | 5/1938 | Earle | 209—166 |
| 2,576,464 | 11/1951 | Langmeier | 209—166 |
| 3,056,713 | 10/1962 | Gartner | 162—5 |

FOREIGN PATENTS 530,556 12/1940 Great Britain.

DONALL H. SYLVESTER, *Primary Examiner.*

HERBERT L. MARTIN, *Examiner.*